(12) United States Patent
Kraipak et al.

(10) Patent No.: US 8,412,976 B2
(45) Date of Patent: Apr. 2, 2013

(54) DATA NEGOTIATION USING SERIAL VOLTAGE IDENTIFICATION COMMUNICATION

(75) Inventors: Waseem S. Kraipak, Maharashtra (IN); Jayesh Iyer, Karnataka (IN); Edward R. Stanford, DuPont, WA (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 12/912,924

(22) Filed: Oct. 27, 2010

(65) Prior Publication Data

US 2011/0154075 A1    Jun. 23, 2011

(30) Foreign Application Priority Data

Dec. 23, 2009    (IN) .......................... 2695/DEL/2009

(51) Int. Cl.
*G06F 5/06*    (2006.01)
(52) U.S. Cl. ...................................... 713/600
(58) Field of Classification Search .................. 713/600
See application file for complete search history.

(56) References Cited

U.S. PATENT DOCUMENTS

| 6,067,585 | A | * | 5/2000 | Hoang ............................. 710/11 |
| 6,532,506 | B1 | | 3/2003 | Dunstan et al. |
| 6,539,443 | B1 | | 3/2003 | Dunstan et al. |
| 6,735,633 | B1 | * | 5/2004 | Welch et al. .................. 709/233 |
| 7,143,215 | B2 | | 11/2006 | Dunstan et al. |
| 2008/0154400 | A1 | * | 6/2008 | Wang .............................. 700/94 |

* cited by examiner

*Primary Examiner* — Mark Connolly
(74) *Attorney, Agent, or Firm* — Buckley, Maschoff & Talwalkar LLC

(57) ABSTRACT

According to some embodiments, a method and system are provided to initiate communication at an integrated circuit that is electrically coupled to a plurality of voltage regulators, determine a slowest one of the plurality of voltage regulators that is electrically coupled to the processor, transmit address information to the plurality of voltage regulators that are electrically coupled to the processor at a first speed associated with the slowest one of the plurality of voltage regulators, determine a second speed associated with a voltage regulator to which the address information is associated, and transmit a second portion of the packet at the second speed associated with the voltage regulator to which the address information is associated.

16 Claims, 6 Drawing Sheets

200

---

Initiate communication at a processor that is electrically coupled to a plurality of voltage regulators

201

↓

Determine a first speed associated with a first voltage regulator of the plurality of voltage regulators that is slower than a second voltage regulator of the plurality of voltage regulators, wherein the plurality of voltage regulators is electrically coupled to the integrated circuit 202

↓

Transmit address information to the plurality of voltage regulators that are electrically coupled to the integrated circuit at the first speed

203

↓

Determine a second speed associated with a voltage regulator to which the address information is associated

204

↓

Communicate at the second speed to the voltage regulator to which the address information is associated

DATA NEGOTIATION USING SERIAL VOLTAGE IDENTIFICATION COMMUNICATION

BACKGROUND

Computer systems include many onboard systems that consume significant amounts of power. In some situations, a user may be using the computer system for tasks that do not require the use of each onboard system or that do not require each onboard system to function at full power. In this situation, the computer system may want to reduce power to specific onboard systems by sending a signal from a processor to a voltage regulator associated with the specific onboard systems.

In conventional computer systems, each voltage regulator must be configured to communicate with the processor at a set frequency that is pre-determined by the processor. For example, if the processor is configured to communicate at a frequency of 25 MHz, then each voltage regulator must communicate at 25 MHz. If a voltage regulator is not capable of communicating at the processor's pre-determined frequency, then the voltage regulator will not be able to communicate with the onboard processor.

BRIEF DESCRIPTION OF THE DRAWINGS

FIG. 2 illustrates a method according to some embodiments.

DETAILED DESCRIPTION

Figure 1:
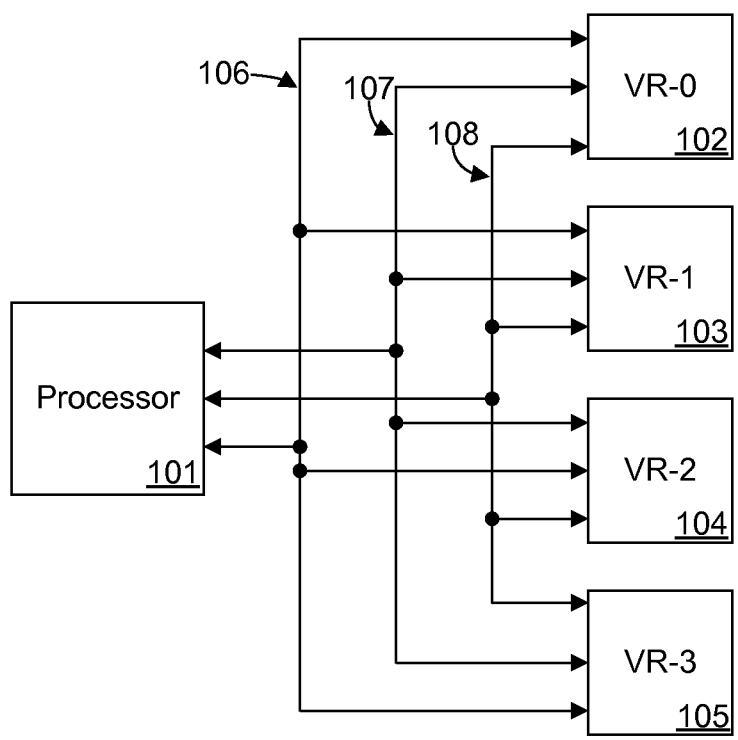
FIG. 1 illustrates a system according to some embodiments.

Referring now to FIG. 1, an embodiment of a system 100 is shown. The system 100 may comprise a processor 101 (e.g., a central processing unit or an integrated circuit), a plurality of voltage regulators 102/103/104/105, an open drain serial voltage identification (SVID) data bus 106, a SVID clock bus 107, and an open drain alert bus 108. In some embodiments, the voltage regulators 102/103/104/105 may comprise any slave device that is coupled to the SVID data bus 106, the SVID clock bus 107, and the alert bus 108.

The processor 101 may be electrically coupled to each of the plurality of voltage regulators 102/103/104/105 via the SVID data bus 106, the SVID clock bus 107, and the alert bus 108. As indicated by their name, the SVID data bus 106 and the SVID clock bus 107 may facilitate serial communication between the processor 101 and the plurality of voltage regulators 102/103/104/105. In some embodiments of FIG. 1, a first one of the plurality of voltage regulators 102/103/104/105 may communicate with the processor 101 at a different frequency than a second one of the plurality of voltage regulators 102/103/104/105. For example, the voltage regulator VR-0 102 may communicate with the processor 101 at 25 MHz and voltage regulator VR-1 103 may communicate with the processor 101 at 22 MHz.

Now referring to FIG. 2, an embodiment of a method 200 is illustrated. According to some embodiments, the method 200 may facilitate communication between voltage regulators having different maximum communication speeds and an integrated circuit on a same serial bus. The method 200 may be performed by a system, such as, but not limited to, the system of FIG. 1. At 201, communication may be initiated at a integrated circuit that is electrically coupled to a plurality of voltage regulators. Communication may be initiated via a SVID data bus (e.g., an interconnect) and initiating communication may comprise driving (e.g., setting) a first bit of a SVID bus protocol packet to a first state (e.g., zero). In some embodiments, the integrated circuit may comprise a counter and initiating communication may further comprise initializing the counter (e.g., setting the counter to zero).

Figure 4:
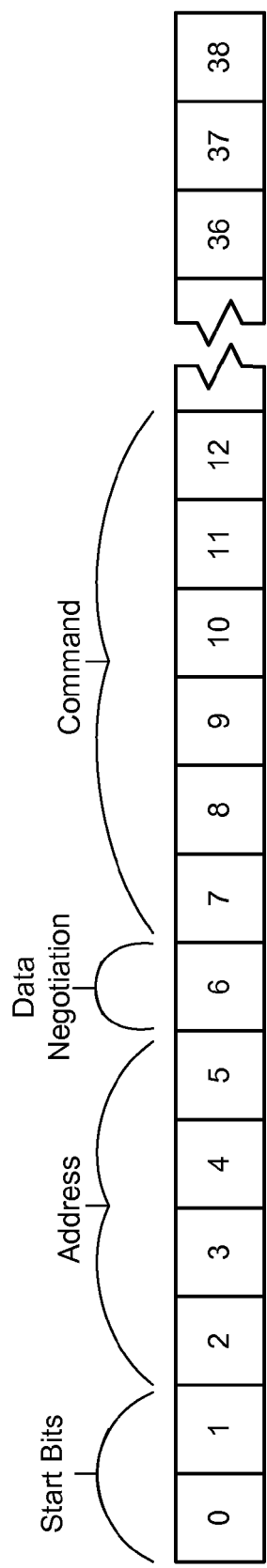
FIG. 4 illustrates a packet according to some embodiments.

In some embodiments, after the integrated circuit resets the counter to zero, the integrated circuit may drive a first bit of a SVID bus protocol packet to a first state (e.g. zero) and start incrementing the counter. For example, and referring now to FIG. 4, the integrated circuit may start to send a 39-bit protocol packet that comprises two start bits, one data negotiation bit, and a 36-bit data frame. The integrated circuit may drive and hold the first bit at the first state for a time associated with a data rate of the integrated circuit and then wait until each voltage regulator that is coupled to the integrated circuit drives the first bit to a second state (e.g., one). In some embodiments, the integrated circuit may release the first bit on SVID data bus to the second state.

For illustrative purposes, and to aid in understanding features of the specification, an example will now be introduced. This example is not intended to limit the scope of the claims. For example, and referring to FIG. 1, a processor 101 may support a maximum data rate of 25 MHz, VR-0 102 may communicate with the processor 101 at 25 MHz, VR-1 103 may communicate with the processor at 22 MHz, VR-2 104 may communicate with the processor at 20 MHz, and VR-3 105, may communicate with the processor at 15 MHz. The processor 101, which includes a counter, may set the counter to zero. The processor 101, communicating at a data rate of 25 MHz, may initiate a SVID bus protocol packet on a SVID data bus by driving a first bit of the protocol packet to low (e.g., setting the SVID data bus to low) and, in response to driving the bit low, each voltage regulator VR-0/VR-1/VR-2/VR-3 may hold the SVID data bus low for a time associated with its particular data rate. The processor 101 may hold the SVID data bus low for a time period associated with 25 MHz (i.e., $\frac{1}{25}$ μs a time equal to the signal period corresponding to 25 MHz).

Referring back to FIG. 2, at 202, a first speed associated with a first voltage regulator of the plurality of voltage regulators that is slower than a second voltage regulator of the plurality of voltage regulators where the plurality of voltage regulators is electrically coupled to the integrated circuit may be determined. Determining the speed may comprise monitoring, via the processor, the SVID bus to determine a maximum number of clock cycles (i.e., time) associated with the plurality of voltage regulators to hold the first bit of the SVID bus protocol to a first state (e.g., zero), before releasing it to a second state (e.g., one).

The counter may determine the number of clock cycles.

In some embodiments, once each voltage regulator drives the SVID data bus to the second state (e.g., sets the first bit of the protocol packet to one or sets the first bit of the protocol packet high), the counter may stop incrementing and a speed associated with the a slowest voltage regulators may be determined. In some embodiments, and in response to the processor driving the first bit of the SVID bus protocol to the first state (e.g., holding SVID bus low), each of the voltage regulators may also hold the first bit of the SVID bus protocol to the first state (e.g., SVID bus low) for a time period associated with its particular data rate and may then will release the bus (e.g., a first bit of the SVID bus protocol is released to one). Once the SVID data bus is released (e.g., a first bit of the SVID bus protocol is set to one), the counter may stop incrementing and a slowest speed associated with the voltage regulators may be determined.

Figure 5:
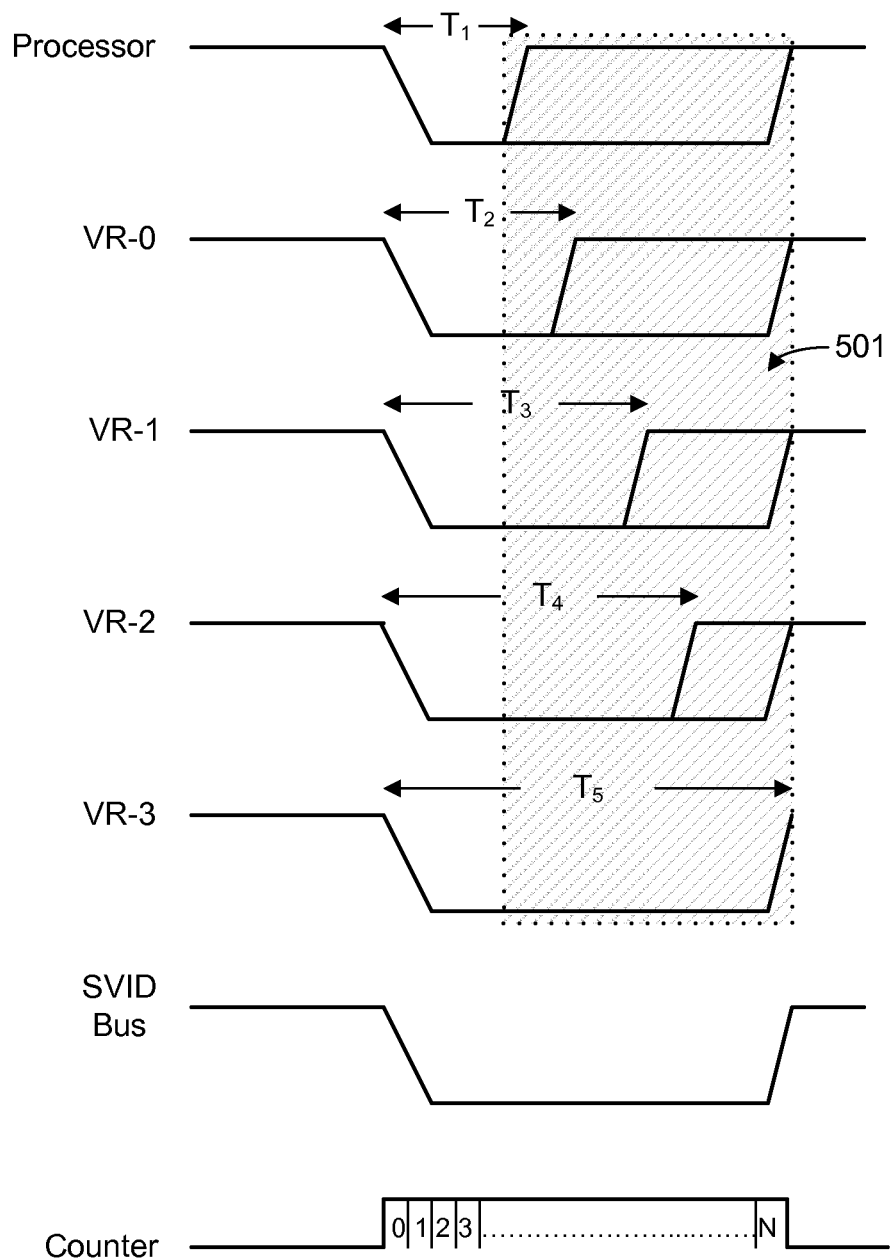
FIG. 5 is a timing diagram of signals according to some embodiments.

Continuing with the above example, and referring now to FIG. 5, the processor may stop holding the SVID data bus to zero and may release the bus after a time $T_1$. In some embodiments, the processor may attempt to drive the SVID data bus high (e.g., set the first bit of the protocol packet to one) after a time $T_1$. In some embodiments, time $T_1$ may be associated with the processor's data rate. Since VR-0 is a fastest of the voltage regulators (e.g., operates at a higher frequency than the others), VR-0 will be a first voltage regulator to stop holding the SVID data bus to zero and will be a first voltage regulator to try to bring the SVID data bus to one. This is illustrated as time $T_2$. Next, VR-1 may attempt to bring the SVID data bus to one after time $T_3$ because VR-1 is slower than VR-0, but faster than VR-2. Next, VR-2 will attempt to bring the SVID data bus to one at time $T_4$. Finally, VR-3 will attempt to bring the SVID data bus to one after time $T_5$. At time $T_5$, the processor may determine that all voltage regulators have stopped holding the SVID data bus to zero and have brought the SVID data bus to one and the processor will instruct the counter to stop incrementing. At this point, the counter has counted 15 million clock cycles. The processor may then determine a slowest speed based on the counter. According to this example, the determined speed is 15 MHz, which is the speed associated with voltage regulator VR-3. During a time period between an end of T1 and an end of T5, as indicated by 501, the SVID data bus may be tristated by VR-0, VR-1, VR-2, and VR-3.

At 203, address information may be transmitted to the plurality of voltage regulators that are electrically coupled to the integrated circuit at the first speed. In some embodiments, the address information may comprise an address field of a SVID bus protocol packet where the address field is associated with an address of a voltage regulator (i.e., an addressed voltage regulator).

Continuing again with the above example, after a processor determines a slowest speed of the voltage regulators VR-0/VR-1/VR-2/VR-3 (i.e., 15 MHz), the processor may initiate communication with a specific voltage regulator by addressing a SVID bus protocol packet with an address associated with the specific voltage regulator. For example, the processor may send a SVID bus protocol packet to voltage regulator VR-1 by populating an address field in the SVID protocol packet with an address associated with VR-1 and by transmitting the packet via a SVID data bus. The address field in a SVID bus protocol packet may comprise a 4-bit address field such as that illustrated in FIG. 4.

A second speed associated with a voltage regulator to which the address information is associated is determined at 204. Each voltage regulator may listen to the SVID data bus to determine which voltage regulator is being addressed. If a voltage regulator determines that it is not being addressed, the voltage regulator may not participate further in the remaining bits of SVID protocol packet being transmitted.

If a voltage regulator determines that it is being addressed, then a next bit after the address field in an SVID protocol packet (i.e., a data negotiation bit) may be used to determine a speed associated with the addressed voltage regulator.

In some embodiments, determining a second speed associated with an addressed voltage regulator at 204 may comprise initializing a counter to zero, driving a next bit after the address field of a SVID bus protocol packet to zero, and monitoring an alert bus. The alert bus may be monitored to determine a number of clock cycles associated with the time period for which the processor and the addressed voltage regulator may drive and hold the next bit after the address field to zero (e.g., to drive the SVID data bus low).

Figure 6:
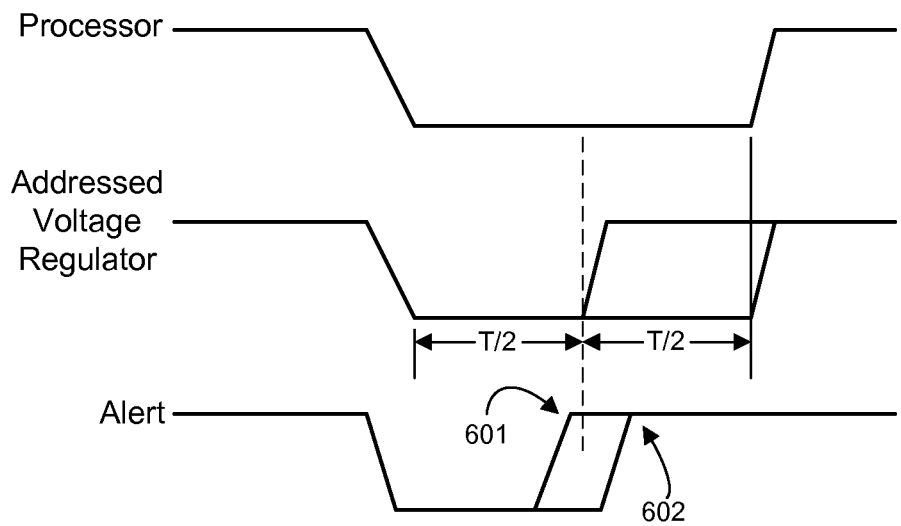
FIG. 6 is a timing diagram of signals according to some embodiments.

Now referring to FIG. 6, during a time period used to send the data negotiation bit, the processor may drive the SVID data bus low for a time period associated with the second speed. The processor, during the same time period, may also drive an alert bus to low for one half of a time period associated with the data rate of the processor.

At substantially a same time as the processor drives both the SVID data bus and the alert bus low, the addressed voltage regulator may drive the SVID data bus low for one half of a time period associated with a data rate of the addressed voltage regulator. The addressed voltage regulator may also drive the alert bus low for one half of the time period associated with a data rate of the addressed voltage regulator.

During the time period used to send data negotiation bit, both the processor and the addressed voltage regulator may monitor the alert bus. As soon as the alert bus goes low, a first counter contained in the processor and a second counter contained in the addressed voltage regulator may be reset and both counters may start counting until the alert bus goes high. In some embodiments, the alert bus may comprise an open drain bus and thus both the processor and the addressed voltage regulator may see the alert bus as low until both the processor and the addressed voltage regulator de-assert the line.

Continuing with the above example, the processor may have sent an SVID bus protocol packet containing an address associated with voltage regulator VR-1 over a SVID data bus at the first speed. In the present example, the first speed is 15 MHz and the speed associated with VR-1 (i.e., the second speed) is 22 MHz. If the processor operates at 25 MHz then a time to send one bit may be 40 ns. Therefore, the processor may drive the alert bus low for 20 ns and then de-assert the alert bus as illustrated at 601. Since VR-1, the addressed voltage regulator, operates at 22 MHz then, a time for VR-1 to send one bit may be approximately 45 ns. Therefore, the addressed voltage regulator VR-1 may drive each of the SVID data bus and the alert bus low for 22.5 ns. After the 22.5 ns time period, and as illustrated at 602, VR-1 may de-assert the alert bus. The processor may continue to drive the SVID data bus low for a full cycle associated with VR-1, which is 45 ns. According to some embodiments, when the alert bus is seen as high, the processor and the addressed voltage regulator may stop their respective counters and shift a count value left by one bit to determine a negotiated data rate. The second speed may therefore be based on the counter associated with the processor and the counter associated with the addressed voltage regulator.

At 205 the voltage regulator to which the address information is associated may be communicated with at the second speed. After the second speed is determined, the processor may continue to transmit the rest of the SVID bus protocol packet at the second speed (i.e., 22 MHz) at 205. According to some embodiments, the method 200 may facilitate voltage regulators that communicate at different speeds to communicate with a processor on a same serial bus and to increase throughput for voltage regulators that can communicate faster than a slowest determined speed.

Figure 3:
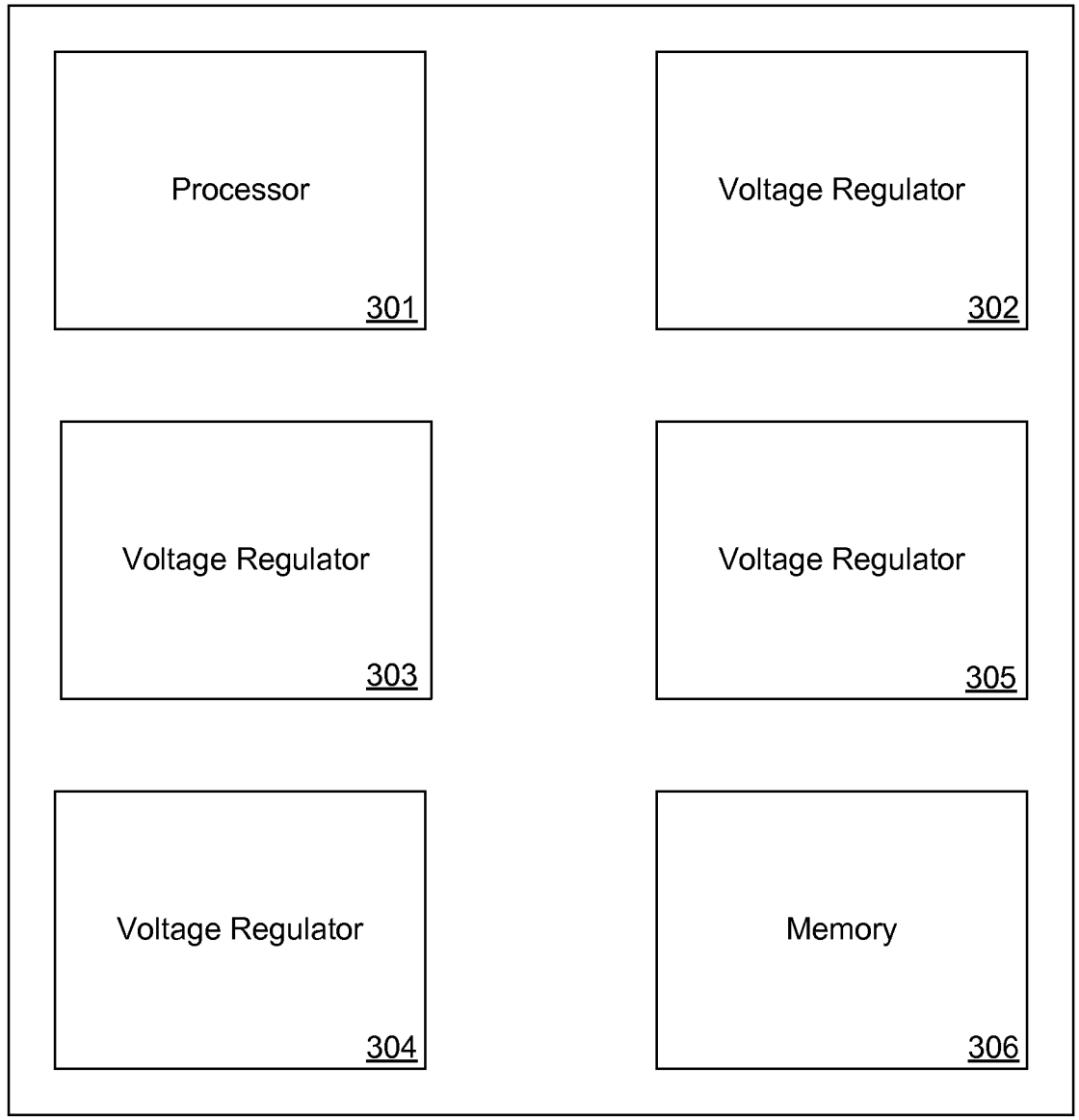
FIG. 3 illustrates a system according to some embodiments.

Now referring to FIG. 3, an embodiment of a computer system 300 is illustrated. The computer system may comprise a processor 301, a plurality of voltage regulators 302/303/304/305, and memory 306.

The memory 306 may store, for example, applications, programs, procedures, and/or modules that store instructions to be executed. The memory 306 may comprise, according to some embodiments, any type of memory for storing data, such as a Single Data Rate Random Access Memory (SDR-RAM), a Double Data Rate Random Access Memory (DDR-RAM), or a Programmable Read Only Memory (PROM).

The processor 301 may include or otherwise be associated with dedicated registers, stacks, queues, etc. that are used to execute program code and/or one or more of these elements may be shared there between. The processor 301 may include or otherwise be associated with dedicated registers, stacks, queues, etc. that are used to execute program code and/or one or more of these elements may be shared there between. In some embodiments, the processor may comprise an integrated circuit. The processor 301 may comprise circuitry to perform a method such as, but not limited to, the method described with respect to FIG. 2.

Each of the plurality of voltage regulators 302/303/304/305 may comprise an electrical regulator designed to automatically maintain a constant voltage level. Each of the plurality of voltage regulators 302/303/304/305 may use an electromechanical mechanism, or passive and/or active electronic components to regulate one or more AC or DC voltages.

Various modifications and changes may be made to the foregoing embodiments without departing from the broader spirit and scope set forth in the appended claims.

What is claimed is:

1. A method comprising:
   initiating communication at an integrated circuit that is electrically coupled to a plurality of voltage regulators, comprising:
      initializing a counter, and
      driving a first bit of a protocol packet to a first state;
   determining a first speed associated with a first voltage regulator of the plurality of voltage regulators that is slower than a second voltage regulator of the plurality of voltage regulators, wherein the plurality of voltage regulators is electrically coupled to the integrated circuit, comprising:
      monitoring an interconnect to determine a maximum number of clock cycles associated with the plurality of voltage regulators to drive the first bit of the protocol packet to a second state;
   transmitting address information to the plurality of voltage regulators that are electrically coupled to the integrated circuit at the first speed;
   determining a second speed associated with a voltage regulator to which the address information is associated; and
   communicating at the second speed to the voltage regulator to which the address information is associated.

2. The method of claim 1, wherein the counter is initialized to zero.

3. The method of claim 1, wherein the counter is stopped at a time associated with the maximum number of clock cycles associated with the plurality of voltage regulators to drive the first bit of the protocol packet to a second state.

4. The method of claim 1, wherein the protocol packet comprises 39 bits and wherein the protocol packet is associated with a serial voltage identification (SVID) interconnect.

5. The method of claim 1, wherein transmitting address information to the plurality of voltage regulators that are electrically coupled to the integrated circuit at the first speed comprises:
   transmitting an address field of a protocol packet, the address field associated with an address of a voltage regulator.

6. A method, comprising:
   initiating communication at an integrated circuit that is electrically coupled to a plurality of voltage regulators;
   determining a first speed associated with a first voltage regulator of the plurality of voltage regulators that is slower than a second voltage regulator of the plurality of voltage regulators, wherein the plurality of voltage regulators is electrically coupled to the integrated circuit;
   transmitting address information to the plurality of voltage regulators that are electrically coupled to the integrated circuit at the first speed;
   determining a second speed associated with a voltage regulator to which the address information is associated, comprising:
      initializing a counter;
      driving a next bit after an address field of a protocol packet to a first state,
      monitoring an alert interconnect to determine a number of clock cycles associated with both the CPU driving the next bit to a second state and a number of clock cycles associated with the voltage regulator to which to which the address information is associated driving the next bit to the second state; and
   communicating at the second speed to the voltage regulator to which the address information is associated.

7. An apparatus comprising:
   an integrated circuit comprising:
   circuitry to initiate communication at an integrated circuit that is electrically coupled to a plurality of voltage regulators, comprising:
      initializing a counter, and
      driving a first bit of a protocol packet to zero;
   circuitry to determine a first speed associated with a first voltage regulator of the plurality of voltage regulators that is slower than a second voltage regulator of the plurality of voltage regulators, wherein the plurality of voltage regulators is electrically coupled to the integrated circuit, comprising:
      monitoring an interconnect to determine a maximum number of clock cycles associated with the plurality of voltage regulators to drive the first bit of the protocol packet to a second state;
   circuitry to transmit address information to the plurality of voltage regulators that are electrically coupled to the integrated circuit at the first speed;
   circuitry to determine a second speed associated with a voltage regulator to which the address information is associated; and
   circuitry to communicate at the second speed to the voltage regulator to which the address information is associated.

8. The apparatus of claim 7, wherein the protocol packet comprises 39 bits and wherein the protocol packet is associated with a serial voltage identification (SVID) interconnect.

9. The apparatus of claim 7, wherein the counter is stopped at a time associated with the maximum number of clock cycles associated with the plurality of voltage regulators to drive the first bit of the SVID bus protocol packet to a second state.

10. The apparatus of claim 7, wherein transmitting address information to the plurality of voltage regulators that are electrically coupled to the integrated circuit at the first speed comprises:

transmitting an address field of a protocol packet, the address field associated with an address of a voltage regulator.

11. An apparatus, comprising:
an integrated circuit comprising:
circuitry to initiate communication at an integrated circuit that is electrically coupled to a plurality of voltage regulators;
circuitry to determine a first speed associated with a first voltage regulator of the plurality of voltage regulators that is slower than a second voltage regulator of the plurality of voltage regulators, wherein the plurality of voltage regulators is electrically coupled to the integrated circuit;
circuitry to transmit address information to the plurality of voltage regulators that are electrically coupled to the integrated circuit at the first speed;
circuitry to determine a second speed associated with a voltage regulator to which the address information is associated, comprising:
initializing a counter;
driving a next bit after an address field of a protocol packet to a first state;
monitoring an alert interconnect to determine a number of clock cycles associated with both the CPU driving the next bit to a second state and a number of clock cycles associated with the voltage regulator to which to which the address information is associated driving the next bit to the second state; and
circuitry to communicate at the second speed to the voltage regulator to which the address information is associated.

12. A system comprising:
a plurality of voltage regulators;
an interconnect that is electrically coupled to an integrated circuit and the plurality of voltage regulators; and
the integrated circuit comprising:
circuitry to initiate communication at an integrated circuit that is electrically coupled to the plurality of voltage regulators, comprising:
initializing a counter, and
driving a first bit of a protocol packet to a first state;
circuitry to determine a first speed associated with a first voltage regulator of the plurality of voltage regulators that is slower than a second voltage regulator of the plurality of voltage regulators, wherein the plurality of voltage regulators is electrically coupled to the integrated circuit, comprising
monitoring an interconnect to determine a maximum number of clock cycles associated with the plurality of voltage regulators to drive the first bit of the protocol packet to a second state;
circuitry to transmit address information to the plurality of voltage regulators that are electrically coupled to the integrated circuit at the first speed;
circuitry to determine a second speed associated with a voltage regulator to which the address information is associated; and
circuitry to communicate at the second speed to the voltage regulator to which the address information is associated.

13. The system of claim 12, wherein the protocol packet comprises 39 bits and wherein the protocol packet is associated with a serial voltage identification (SVID) interconnect.

14. The system of claim 12, wherein the counter is stopped at a time associated with the maximum number of clock cycles associated with the plurality of voltage regulators to drive the first bit of the protocol packet to a second state.

15. The system of claim 12, wherein transmitting address information to the plurality of voltage regulators that are electrically coupled to the integrated circuit at the first speed comprises:
transmitting an address field of a protocol packet, the address field associated with an address of a voltage regulator.

16. A system, comprising:
a plurality of voltage regulators;
an interconnect that is electrically coupled to an integrated circuit and the plurality of voltage regulators; and
the integrated circuit comprising:
circuitry to initiate communication at an integrated circuit that is electrically coupled to the plurality of voltage regulators;
circuitry to determine a first speed associated with a first voltage regulator of the plurality of voltage regulators that is slower than a second voltage regulator of the plurality of voltage regulators, wherein the plurality of voltage regulators is electrically coupled to the integrated circuit;
circuitry to transmit address information to the plurality of voltage regulators that are electrically coupled to the integrated circuit at the first speed;
circuitry to determine a second speed associated with a voltage regulator to which the address information is associated, comprising:
initializing a counter,
driving a next bit after an address field of a protocol packet to the first state, and
monitoring an alert interconnect to determine a number of clock cycles associated with both the CPU driving the next bit to a second state and a number of clock cycles associated with the voltage regulator to which to which the address information is associated driving the next bit to the second state; and
circuitry to communicate at the second speed to the voltage regulator to which the address information is associated.

* * * * *